United States Patent [19]

Rosekrans et al.

[11] Patent Number: 5,450,571
[45] Date of Patent: Sep. 12, 1995

[54] DIALOG FILTERING PROCESS FOR A PRINTING SYSTEM TO FILTER OUT NON-SELECTABLE PRINT PROGRAMMING SELECTIONS

[75] Inventors: Steven V. Rosekrans, Rochester; Thomas M. Bellucco, Webster; Sharon A. Catapano, Rochester; Joseph A. DiProspero, Rochester; Samuel A. Fedele, Rochester; Lawrence P. Frumusa, Rochester; David C. Fuller, Rochester; Elliot J. Sobel, Rochester; Suzanne M. Zingo, Rochester, all of N.Y.

[73] Assignee: Xerox Corporation, Stamford, Conn.

[21] Appl. No.: 293,521

[22] Filed: Aug. 19, 1994

Related U.S. Application Data

[63] Continuation of Ser. No. 752,155, Aug. 29, 1991, abandoned.

[51] Int. Cl.⁶ .................................................. G06F 15/00
[52] U.S. Cl. ................................. 395/500; 395/112; 395/155; 355/209
[58] Field of Search .............................. 395/155, 112

[56] References Cited

U.S. PATENT DOCUMENTS

| | | | |
|---|---|---|---|
| 4,500,964 | 2/1985 | Nickle | 395/575 |
| 4,556,959 | 12/1985 | Allen et al. | 400/70 |
| 4,649,513 | 3/1987 | Martin et al. | 364/900 |
| 4,651,278 | 3/1987 | Herzog et al. | 364/300 |
| 4,754,428 | 6/1988 | Schultz et al. | 364/900 |
| 4,809,220 | 2/1989 | Carlson et al. | 395/275 |
| 4,852,019 | 7/1989 | Vinberg et al. | 364/521 |
| 4,903,229 | 2/1990 | Schmidt et al. | 395/600 |
| 4,947,345 | 8/1990 | Paradise et al. | 355/422 |
| 4,970,549 | 11/1990 | Yoshizuka et al. | 355/209 |
| 4,970,554 | 11/1990 | Rourke | 355/209 |
| 5,012,280 | 4/1991 | Tsutsumi et al. | 355/206 |
| 5,051,926 | 9/1991 | Stevens | 395/155 |
| 5,055,996 | 10/1991 | Keslowitz | 364/188 |
| 5,091,868 | 2/1992 | Pickens et al. | 395/148 |
| 5,113,222 | 5/1992 | Wilson et al. | 355/209 |
| 5,179,637 | 1/1993 | Nardozzi | 395/114 |
| 5,179,649 | 1/1993 | Masuzaki et al. | 395/148 |
| 5,222,236 | 6/1993 | Potash et al. | 395/600 |

FOREIGN PATENT DOCUMENTS

2198566 6/1988 United Kingdom.

OTHER PUBLICATIONS

IBM Corp., 'Enhanced Print Queue Management Program', IBM Technical Disclosure Bulletin, vol. 30, No. 5, Oct. 1987, NY US pp. 242–248.

Primary Examiner—Parshotam S. Lall
Assistant Examiner—Viet Vu
Attorney, Agent, or Firm—Gary B. Cohen; Frederick E. McMullen

[57] ABSTRACT

A network printing system have plural printers for making prints, with some of the printers having different job processing capabilities; plural client inputs providing electronic documents and printing instructions that comprise each print job; and dialog filtering to enable the program selections on a universal job ticket to be edited in accordance with the processing capabilities of each individual printer.

14 Claims, 8 Drawing Sheets

35-1

Typical ASCII Job Ticket

| | |
|---|---|
| %XRXbegin: | 1.31 |
| %XRXdisposition: | PRINT |
| %XRXsenderName: | |
| %XRXtitle: | PostScript File |
| %XRXcopyCount: | 1 |
| %XRXpaperType-size: | 216  279 |
| %XRXdocumentPaperColors: | white |
| %XRXpaperType-opacity: | opaque |
| %XRXpaperType-preFinish: | Plain 0  0 |
| %XRXrecipientName: | |
| %XRXrequirements: | simplex |
| %XRXsignature: | FALSE |
| %XRXsourceFile: | ... |
| %XRXdeleteSource: | FALSE |
| %XRXxImageShift: | 5 |
| %XRXyImageShift: | 0 |
| %XRXend | |

DIALOG FILTERING PROCESS FOR A PRINTING SYSTEM TO FILTER OUT NON-SELECTABLE PRINT PROGRAMMING SELECTIONS

This is a continuation, of application Ser. No. 07/752,155, filed Aug. 29, 1991, abandoned.

The invention relates to network printing systems, and more particularly, to a dialog filtering system for such systems enabling use of a common job ticket throughout the system.

Network printing systems typically combine a number of client inputs such as workstations, personal computers, and the like with one or more printer outputs through a network. In systems of this type, a client at one of the inputs sends the electronic documents that comprise a job over the network to one of the printers selected for printing the job Systems by their very nature are based on a collection or assemblage of different components and thus network printing systems can have a mix of input and output types, with consequent lack of compatibility between the system parts.

In using a network printing system, the client must also provide job programming instructions which in effect tell the printer that has been selected how to process the electronic documents that comprise the job. One desirable way of doing this is to use an electronic job ticket that is displayed on the screen of the client's User Interface. Using a mouse, keyboard, etc., the client selects from the menu of options in the job ticket displayed on the screen the choices that he desires.

However, as discussed above, network systems consist of discrete and often different inputs and outputs, with differing processing abilities and limitations. Thus, one printer output may offer a wide variety of printing selections while a second printer in the same network system may have only a very limited number of choices. As a result, it is necessary that systems of this type have different and special job tickets for each different input/printer output combination.

In the prior art, U.S. Pat. No. 4,970,554 to Rourke discloses a job processing system for electronic copying/printing systems in which an electronic job ticket displayed on the screen of an input station and displaying job programming selections is used to create a hard copy job ticket for assemblage with the hard copy documents that comprise the print jobs. At the printer, the job ticket is scanned by a document scanner and the job printing instructions obtained. U.S. Pat. No. 4,852,019 to Vinberg et al discloses a system for retrieving stored graphics using a central processor to create and translate graphical information into a variety of formats which different users can access. U.S. Pat. No. 4,754,428 to Schultz et al discloses an apparatus and method for distributing documents to remote terminals with different formats wherein a document is converted into a common format prior to transmission over a communication link. And, U.S. Pat. No. 4,651,278 to Herzog et al discloses an interface process for an all-points addressable printer wherein a printer is connected to a host application program which can be present on a number of different computer systems, while U.S. Pat. No. 4,649,513 to Martin et al discloses a system for processing printing data on a single printer wherein each page has a page definition (PAGEDEF) file attached to it containing the page format commands for the particular page.

In contrast, the present invention provides a process for filtering the job programming dialog displayed on the screens of the user interfaces associated with the clients of a network printing system having plural printers, the printer having print queues for selection of a printer by the clients; and a server for transmitting print jobs comprising electronic documents and printing instructions from the clients to the printers, comprising the steps of: providing a common electronic job ticket having a first binary inter-client protocol format and a second client-server protocol format for use by the clients in programming printing instructions for print jobs; providing a printer user interface mask file for each of the printers identifying the programming selections available with each individual print queues; on selection of one of the print queues by one of the clients for printing a print job, accessing the printer user interface mask file for the one print queue; masking the first job ticket format with the printer user interface mask file for the one print queue to convert the common job ticket to a special job ticket with programming selections limited to selections available on the one print queue; using the first job ticket format, displaying the special job ticket on the user interface screen of the one client to enable the one client to generate the second job ticket format with printing instructions for printing the one print job; and transmitting the second job ticket format with the printing instructions for the print job to the selected print queue for printing the electronic documents comprising the print job on the printer associated with the selected print queue.

IN THE DRAWINGS:

FIG. 3 is view showing an example of the client server format of a job ticket;

FIG. 5 is a view depicting an example of a job ticket used to program a print job as displayed on the screen of a client;

As used herein, filtering is the process of applying the printer mask to the User Interface dialogs, while graying refers to a programming selection that is unavailable to the user based on the current mode. Dimming is a generic term used to identify a programming selection which is not available.

Figure 1:
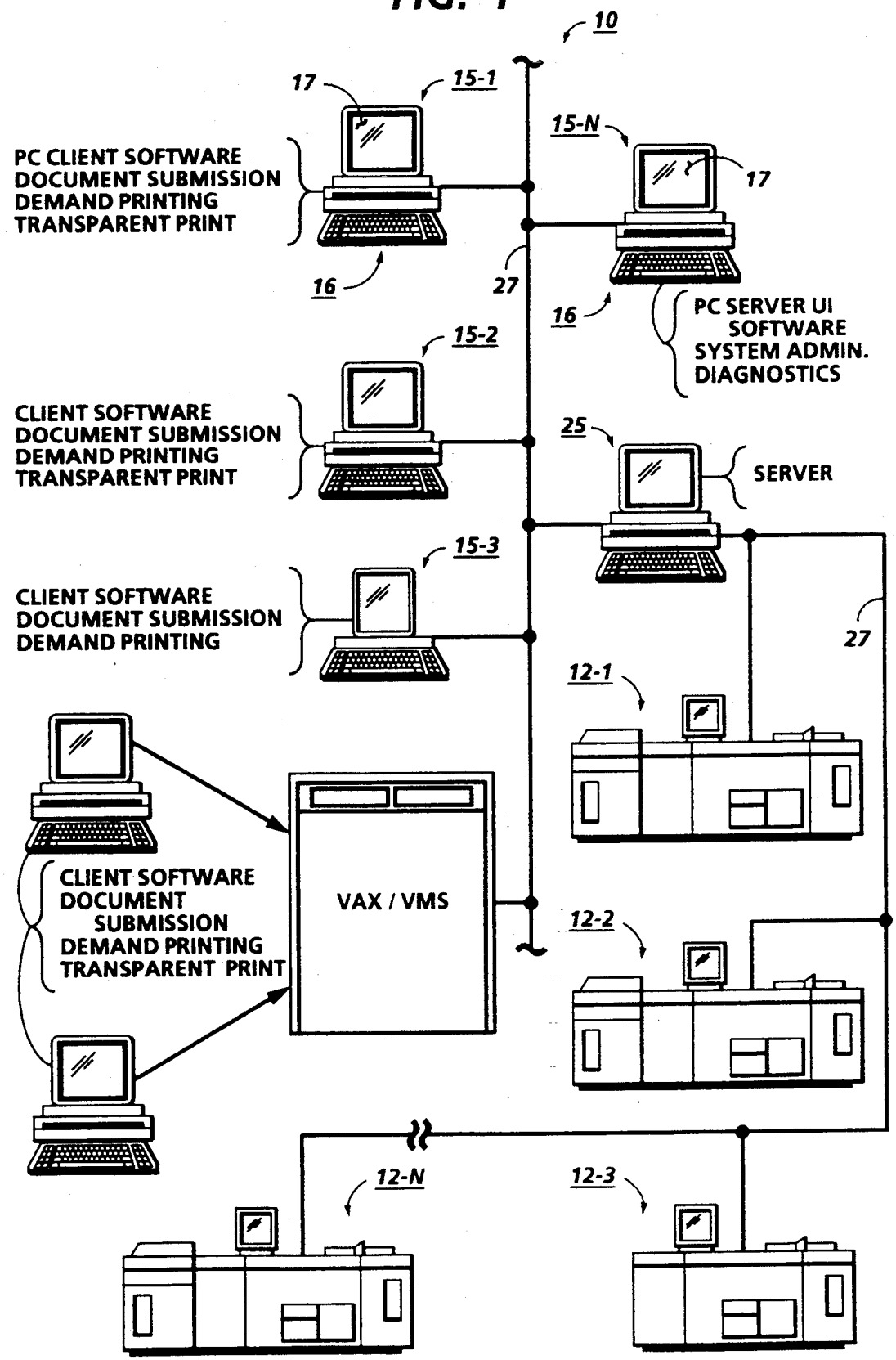
FIG. 1 is a schematic view of a network processing system incorporating the dialog filtering system of the present invention.

Referring to FIG. 1, there is shown a network processing system 10 of the type adapted to incorporate the present invention. Processing system 10 comprises a plurality of printers 12-1, 12-2, 12-3, . . . 12-n for processing print jobs and making prints in accordance with the job programming instructions for each job printed.

Printers 12-1, 12-2, 12-3, . . . 12-n may be any suitable printer capable of producing prints on a print media such as paper from video image signals and may, for example, comprise laser printers, ink jet printers, ionographic printers, etc. In system 10, where multiple printers are integrated into a network processing system, individual printers typically have different document processing capabilities as will appear. As used herein, printers 12-1, 12-2, 12-3, . . . 12-n include virtual printers as discussed more fully hereinbelow.

System 10 provides print processing for various workstations or clients 15-1, 15-2, 15-3, . . . 15-n. Clients 15-1, 15-2, 15-3, . . . 15-n, which may be remote and/or on site, are operatively coupled to printers 12-1, 12-2, 12-3, . . . 12-n through server 25 as will appear. Clients provide the electronic documents that are the source of the print jobs and for this purpose individual ones or all of clients 15-1, 15-2, 15-3, . . . 15-n may have a document scanner, disk input, keyboard, fax, etc. for generating the electronic documents that comprise the job to be printed. Clients 15-1, 15-2, 15-3, . . . 15n have a User Interface (UI) 16 with interactive screen 17 enabling programming selections for print jobs to be made, screen 17 displaying the various programming selections available in the form of a job ticket as will appear. Printers 12-1, 12-2, 12-3, . . . 12-n, clients 15-1, 15-2, 15-3, . . . 15-n, and server 25 are operatively interconnected by network or communication channels 27.

Figure 2:
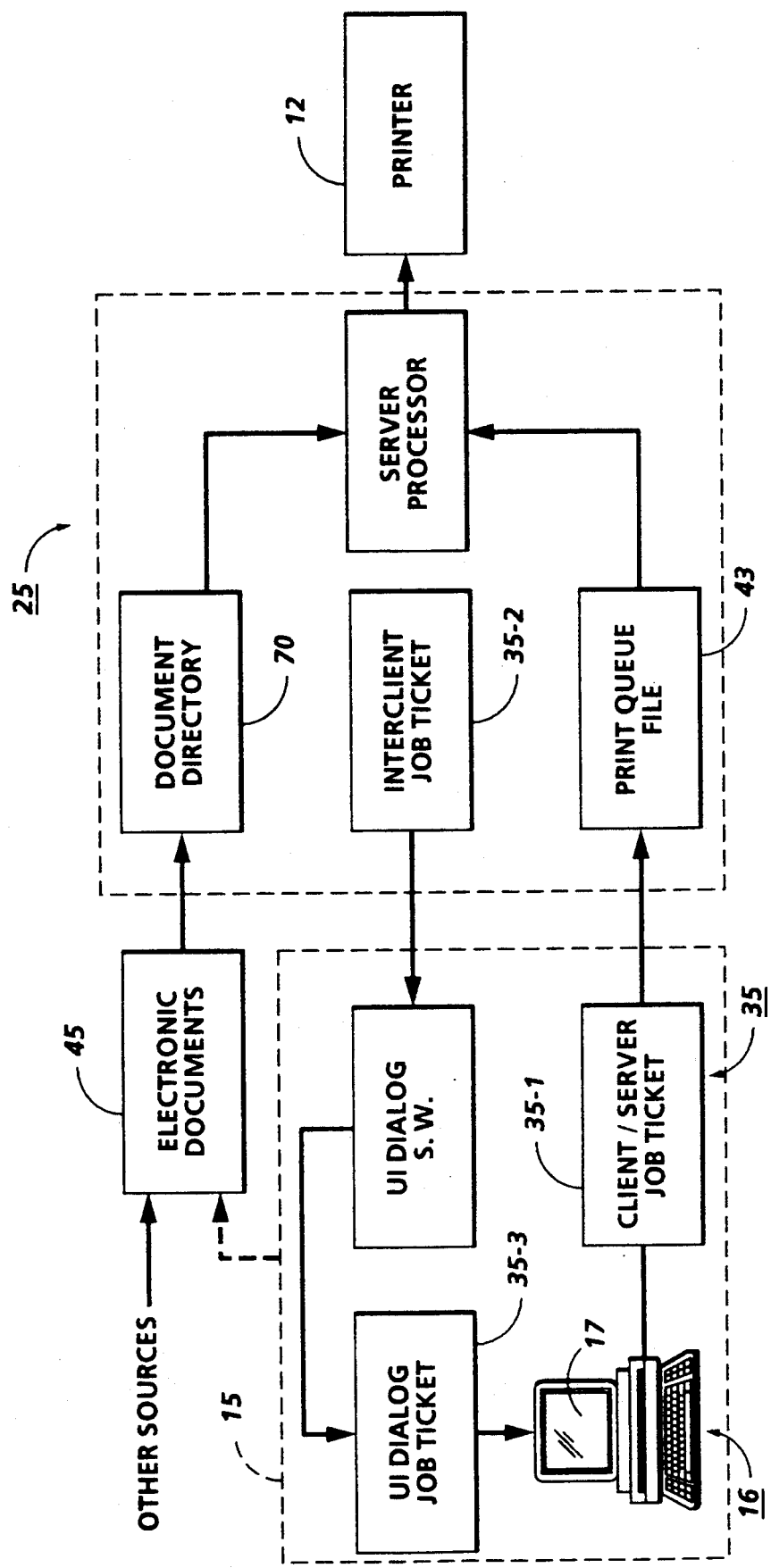
FIG. 2 is a schematic view showing the elements that make up a print job for submission to the print server.

Referring also to FIG. 2, each print job consists of two principal components, image data representing the job being processed (referred to as electronic documents 45) and a job ticket 35. Job ticket 35 contains the programming parameters for the job such as quantity, plex, enlargement, reduction, stock, finishing, etc. while electronic documents 45 are the information that is ultimately printed on the print media, typically paper sheets.

Print queues 42-1, 42-2, 42-3, . . . 42-n (also seen in FIG. 6) are provided for selection by the user in a file 43 on server 25, each print queue 42 being associated with a specific one of the printers 12-1, 12-2, 12-3, . . . 12n. It is understood that there may be plural queues for the same printer as in the case where virtual printers are provided. For example, a printer (referred to herein as virtual printer) may be set up to provide different printer functions, with a corresponding print queue provided for each different printer setup. For example, in printing systems such as system 10, a System Administrator of the type described more fully in copending U.S. application No. 591,330 to John L. Rourke and entitled "Security System for Electronic Printing Systems", filed on Sep. 28, 1990, the disclosure of which is herein incorporated by reference, normally oversees the system, controlling use and access to the system by the different users. In that capacity, the System Administrator may set a system printer to provide different print options, for example, one with print options especially tailored to students, one for faculty, one for librarians, etc. Other virtual printer setups may be envisioned as, for example, virtual printers for different budget centers, locations, etc.

Figure 4:
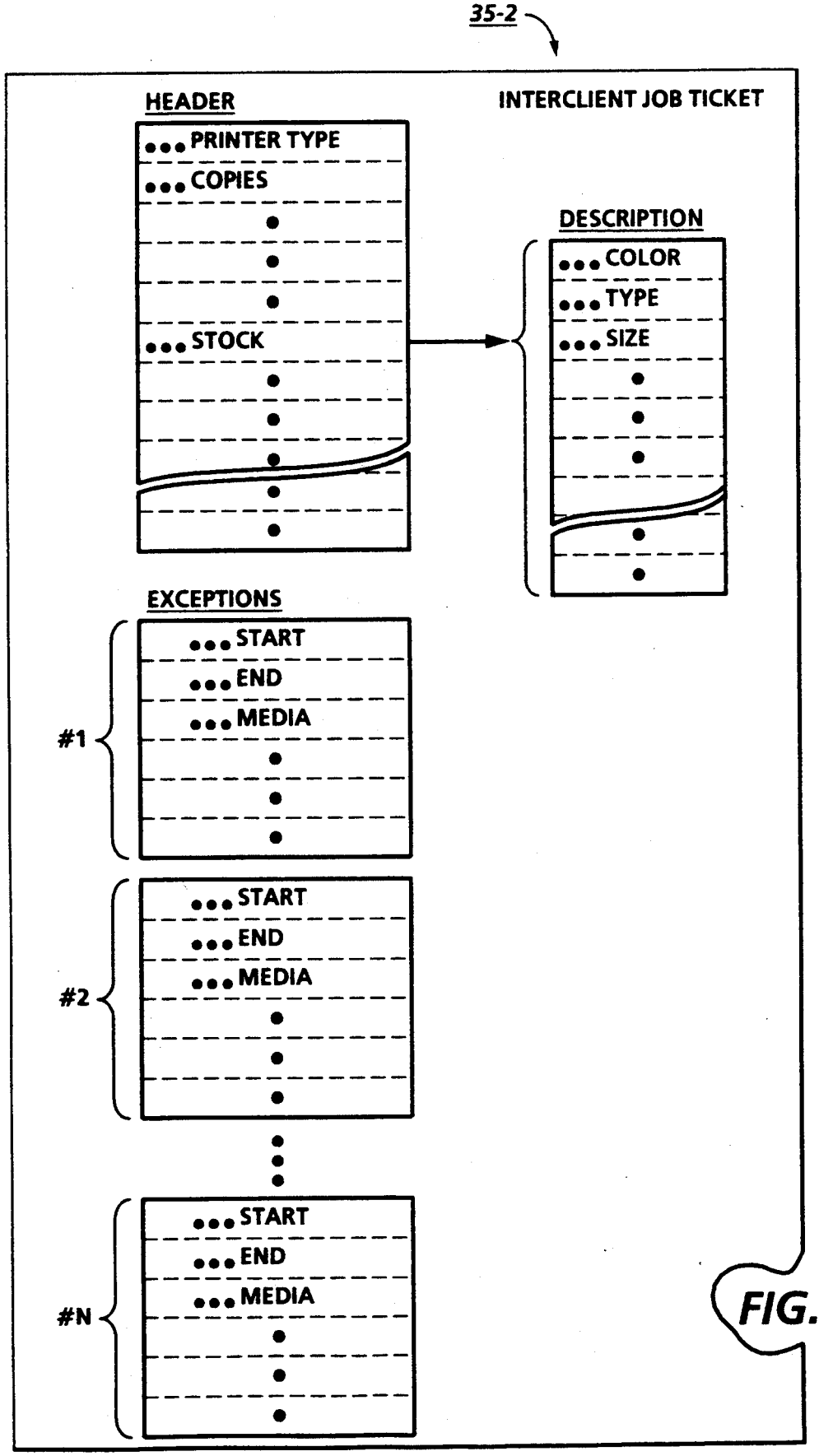
FIG. 4 is a view showing an example of the binary inter-client format of a job ticket.
Figure 5:
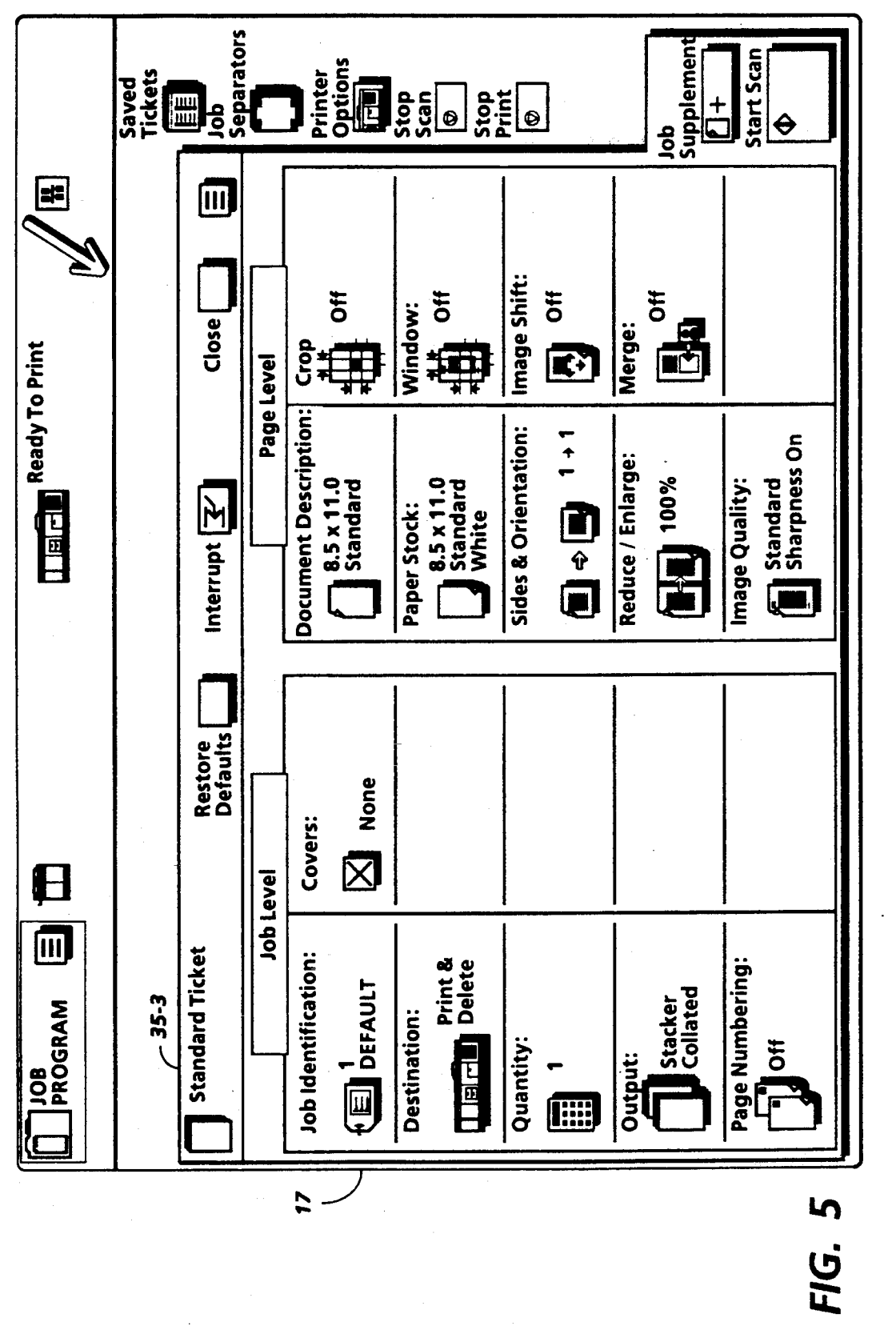

Referring also to FIGS. 3–5, to enable a user at one of clients 15-1, 15-2, 15-3, . . . 15-n to program jobs, an electronic job ticket 35 is provided. Job ticket 35 has multiple formats including a client/server protocol job ticket 35-1 that provides the set of commands that are used to communicate the printing selections from the client 15-1, 15-2, 15-3, . . . 15-n to server 25. Client-/Server Job ticket 35-1 may, for example, be in ASCII format such as shown in FIG. 3.

A second Job Ticket format is an inter-client protocol job ticket 35-2 (an example of which is shown in FIG. 4) that enables a single communication interface between clients 15-1, 15-2, 15-3, . . . 15-n. Interclient Job ticket 35-2, which is held in the system memory of the client, is binary and provides values from a universal set of common defines used by all clients 15-1, 15-2, 15-3, . . . 15-n. Since inter-client job ticket 35-2 is binary, it is not readable and is independent of all server interfaces.

To display Job Ticket 35 in a form that is readable by users on the screens 17 of the clients' User Interfaces 16, job ticket 35-2 is processed by the client UI interface dialog software to provide a UI dialog Job Ticket 35-3 that displays the printing selections available to the user for programming a print job. An example of a UI Dialog Job Ticket 35-3 display is shown in FIG. 5 of the drawings.

Figure 6:
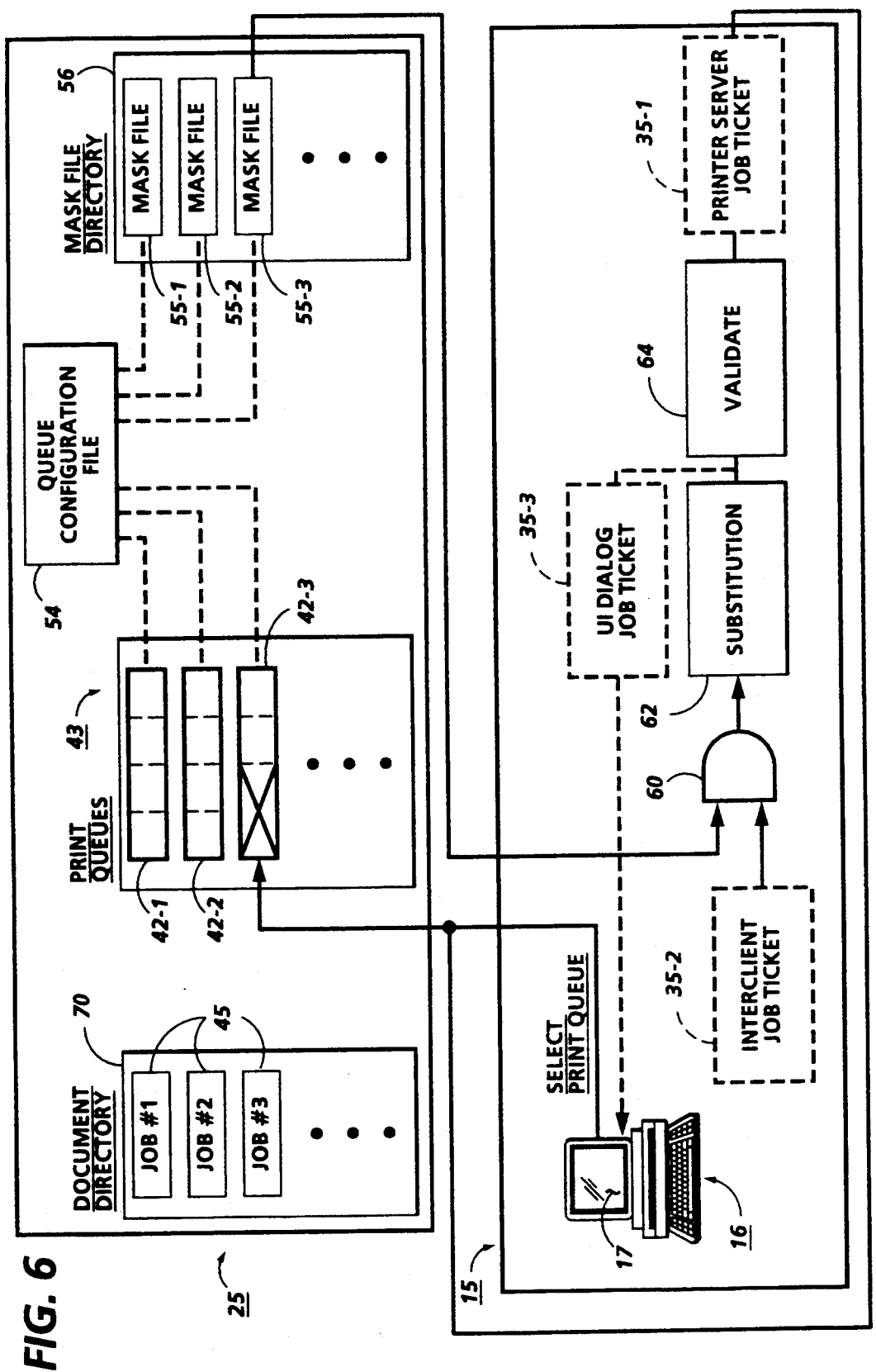
FIG. 6 is a schematic view illustrating printer queue, mask file directory, and queue configuration files in the print server, with AND'ing of a UI mask file for the printer queue selected with the inter-client job ticket to provide a filtered job ticket for programming a job.

Referring also to FIG. 6, prior to submission of a job for printing, the print queue 42-1, 42-2, 42-3, . . . 42-n which services the printer 12-1, 12-2,12-3, or . . . 12-n where the job will be sent, is selected by the client requesting the job. Following this, the job ticket 35 for the job is programmed by the user at the client workstation. Following programming of the printing selections for the job, the client/Server Job Ticket 35-1 that is created is sent to the print queue 42-1, 42-2, 42-3, . . . 42-n selected. The electronic documents 45 that comprises the document papers to be printed, which may reside at the client 15 itself, or in a directory on server 25, or elsewhere in system 10, are also obtained. Where the file 45 resides in server 25, the client/server job ticket 35-1 includes a reference to the file location. Alternately, the file 45 may be prepended to the PDL file. A server/processor in server 25 processes the electronic documents 45 for printing by the selected printer.

Since the various clients 15-1, 15-2, 15-3, . . . 15-n of the system may differ in design, programming features, software, manufacturer, etc., the UI dialog job ticket 35-3 brought up and displayed on each client's screen 17 can be different than the job ticket displayed on the screen of the other clients. One notable difference is in the choice of printing selections. For example, the User Interface 16 of client 15-1 may display a job ticket offering a large selection of print stock size, type, and color to chose from, numerous enlargement/reduction choices, several finishing options such as binding, stapling, etc. whereas the job ticket displayed on another client 15-2 may offer only one or two stock size selections, one or two enlargement/reduction choices, no finishing, etc.

In a similar vein, the functions performed by the system printers 12-1, 12-2,12-3, . . . 12-n can differ from one another. For example, printer 12-1 may be a high speed fully featured printer offering a large selection of print stock size, type, and colors, several finishing choices, various image manipulation choices such as enlargements/reductions, image rotation, etc. while printer 12-2 may be less featured with only a few choices for print stock, no finishing, etc. Similarly, the feature sets provided by any virtual printers may differ.

Since the programming capabilities of the individual clients 15-1, 15-2, 15-3, . . . 15-n and the print function of the individual printers 12-1, 12-2, 12-3, . . . 12-n can differ, dialog filtering of the present invention serves to in effect match the programming abilities of the individual clients with the print functions of the print queue selected to print the job through the Job ticket 35. Dialog filtering provides the infrastructure that enables server 25 to handle a common binary inter-client job ticket 35-2 among multiple printers 12-1, 12-2, 12-3, ... 12-n. As will appear, dialog filtering is accomplished by applying a print mask (referred to hereinbelow as Print UI Mask file 55-1, 55-2, 55-3, ... 55-n), to the Inter-client Job Ticket 35-2 which is used by the User Interface dialogs of clients 15-1, 15-2, 15-3, ... 15-n to generate the UI Dialog Job Ticket 35-3 that is displayed on the client's UI screen 17.

Figure 7:
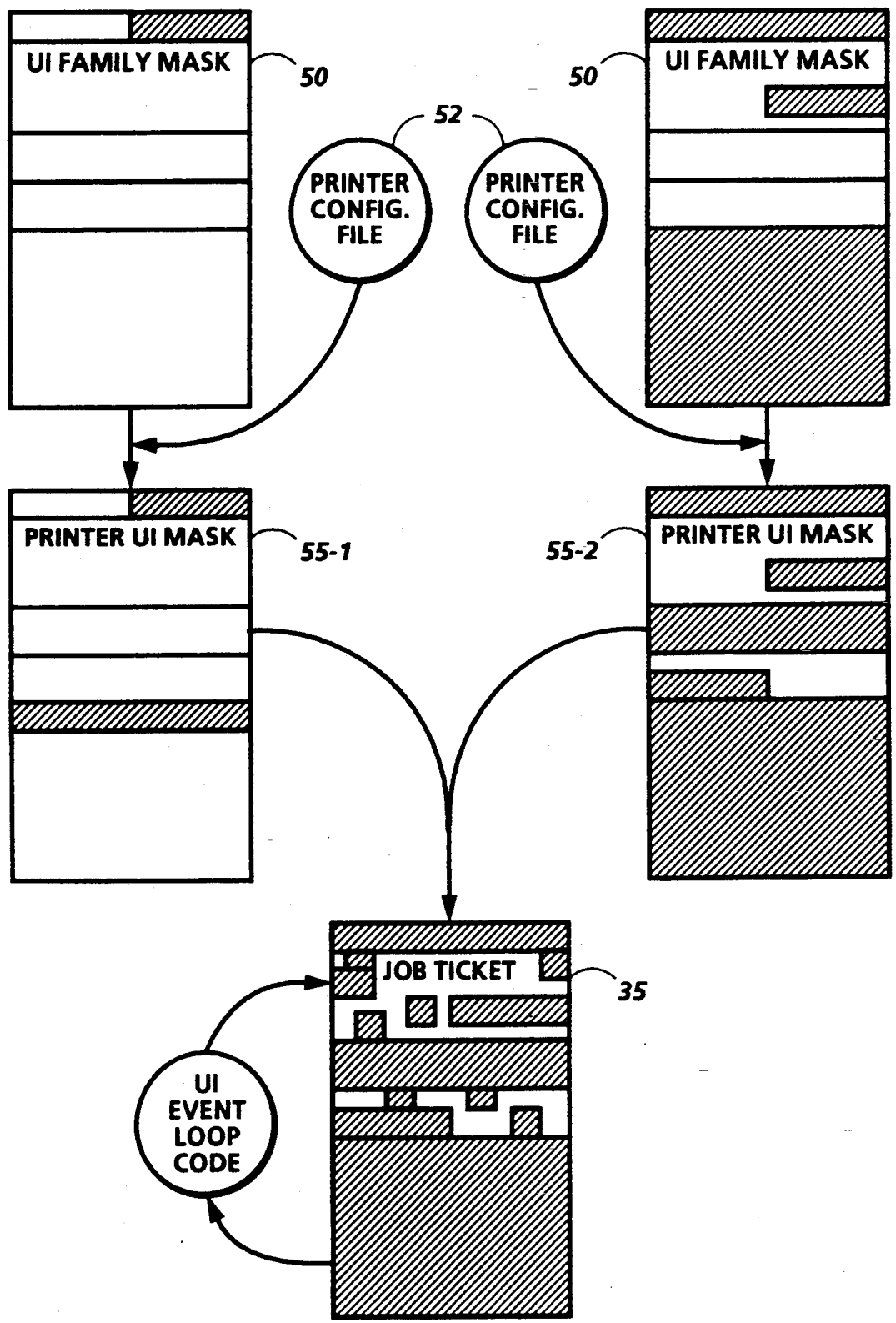
FIG. 7 is a schematic view illustrating examples of dialog filtering as practiced by the present invention to obtain a inter-client job ticket compatible with the printer queue selection.

Referring particularly to FIGS. 6 and 7, server 25 contains a number of configuration/setup files. These include UI Family Mask file 50, Printer Configuration file 52, and Queue Configuration file 54, the latter being a mapping between the print queue 42-1, 42-2, 42-3, ... 42-n for the printer selected and the corresponding Mask file 55-1, 55-2, 55-3, ... 55-n as will appear. UI Family Mask 50 is a single mask which reflects the full capability of a particular printer platform family. For example, printer 12-1 may be sold in a number of different configurations. However, the entire family or class of printer 12-1 is represented by a single universal UI Family Mask 50.

Printer Configuration file 52 comprises a file which reflects the actual configuration of a particular printer. File 52 is created based on input as to how the particular printer has been set up for example by the System Administrator.

During the installation process or at any other time when printers or virtual printers are set up, a Print UI Mask file 55-1, 55-2, 55-3, ... 55-n is generated for each printer using the Printer Configuration file 52 for that printer and the UI Family Mask file 50 for the same family of printers as a template. Printer UI Mask files 55-1, 55-2, 55-3, ... 55-n are held in a Mask file directory 56 in server 25, there being one Printer UI Mask file 55 for each print queue 42. Each print queue is logically associated with a print mask file. Several queues can and usually do point to the same print mask file.

Printer UI Mask files 55, which are used only by the client software, are binary files identical to the structure of the binary inter-client job ticket 35-2. Common defines identifying program selections common to all clients 15 are used, with data in the mask file organized so that each bit in a field, or multiple bits where the field contains numeric/text data, correspond to a potential selection. Fields in binary inter-client job ticket 35-2 can be either null or represent one selection out of a set. For example, in the imaging field, there are three commonly defined selections, one sided, two sided, and tumble duplex with corresponding hexidecimal values of $0\times 01$, $0\times 02$, and $0\times 04$ respectively. In this example, the value $0\times 07$ would indicate that all three options are enabled. The mask file on the other hand can have multiple bits set, each corresponding to an enabled option.

Once a client has selected a print queue 42-1, 42-2, 42-3, ... 42-n, the corresponding Printer UI Mask file 55 in directory 56 is identified through mapping by Queue Configuration file 54. Mask file 55 is applied to the binary inter-client job ticket 35-2 at the client 15-1, 15-2, 15-3, ... 15-n in an AND'ing process (represented by AND gate 60 in FIG. 6). Substitution 62, which is the final step of the filtering process is carried out. As will appear, substitution may or may not be required. Following substitution, validation 64, which is the last step before the client/server ticket 35-1 is sent to server 25, is done. A UI dialog job ticket 35-3 is generated from the inter-client job ticket 35-2 as described for display of the job ticket program selections on the client's UI screen 17. When the print program selections are completed, the electronic documents 45 for the print job are normally placed in a document directory 70 in server 25 while the client/server job ticket 35-1 is sent to the print queue 42 selected.

For substitution 62, the client's software code examines specific fields for a value of "0", "0" being a flag indicating that a substitution is needed. Where substitution is needed, a default setting is provided using the following relationship:

in a field which is "0" in the inter-client job ticket 35-2, look at the same field in the Printer UI mask 55 and substitute the least significant bit which is set.

Figure 8:
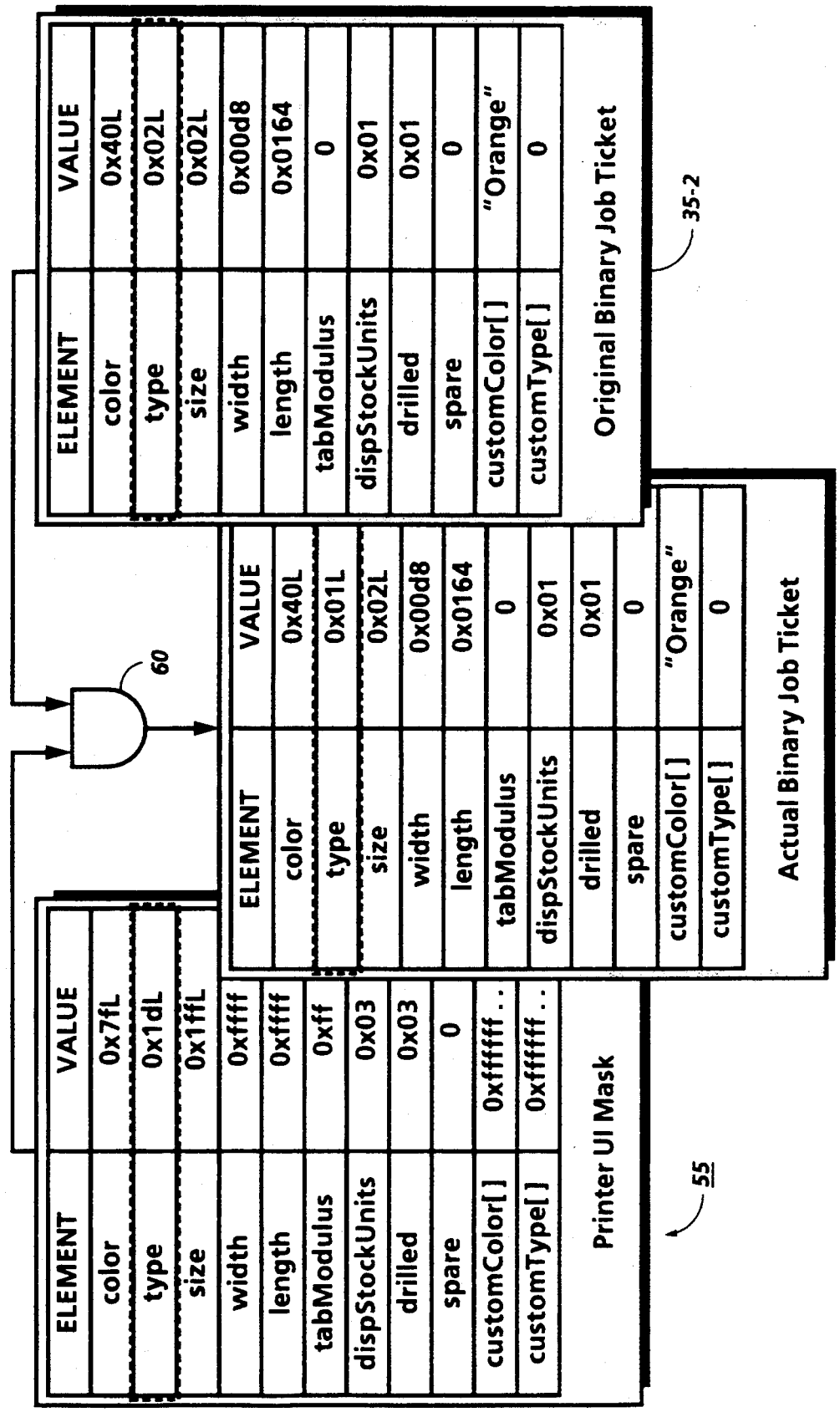
FIG. 8 is a view depicting examples of dialog filtering as practiced by the present invention.

Referring to FIG. 8, an example of substitution 62 is there shown. In this example, the inter-client job ticket 35-2 provides a selection for transparency stock (type-$0\times 02L$, binary .... 00010) whereas the printer UI Mask file 55 for the printer selected at the same position indicates that transparency is not a permissible selection (type-$0\times 1d$, binary ... 011101). AND'ing printer UI Mask file 55 for the print queue selected with job ticket 35-2 yields .... 00000. Accordingly, the least significant bit (i.e., 01) of the printer UI Mask file is substituted to provide a different selection. In this example, $0\times 01$, which corresponds to standard paper stock is the substitute or default selection.

In another example, the color selection provided by the binary inter-client job ticket 35-2 is: color-$0\times 40L$ (which corresponds to the "Custom Color" selection in the common defines file), binary .... 01000000. The corresponding selection in the UI Mask file is: color $0\times 7fL$, binary ..... 01111111. AND'ing results in binary 0010000 or the original $0\times 40L$ selection.

In the case of numeric/text such as Custom Color "Orange", the numeric/text letters (in this case, the text "Orange") are arbitrarily set at "1" Thus, the Custom Color selection is effectively not compared.

Validation 64 is a check to determine if the print program selections made are erroneous or incapable of being carried out. For example, a program selection of stapling as the finishing option in the case where only one sheet is being printed is deemed to be an error since single sheets are not stapled, selecting binding where the number of prints that comprise the book are greater than the maximum number of pages that can be bound at once is deemed to be a selection which the printer is incapable of carrying out since the selection exceeds the capability of the printer hardware, etc.

In cases where printers 12-1, 12-2, 12-3, ... 12-n differ in function, the programming dialogs for the job ticket 35 displayed on the clients' UI 16 must reflect this fact. To do this, the job programming selection(s) that are not available for the printer selected are identified as such by dimming the display for those unavailable selections. This may be effected by graying the intensity of the display for each unavailable programming selection, blanking each unavailable programing selection out so as not to be visible at all, etc.

While the invention has been described with reference to the structure disclosed, it is not confined to the details set forth, but is intended to cover such modifications or changes as may come within the scope of the following claims.

We claim:

1. A network printing system, including a first printer and a second printer, for generating a user interface dialog to be used in printing a network print job, the user interface dialog indicating, to a client user, a set of printing options available at a selected one of the first printer and the second printer, comprising:
   an interclient job ticket indicating, collectively, the printing options available at each of the first printer and the second printer;
   a workstation being associated with said client user and having a display device;
   a print server, being disposed remotely of said workstation and communicating with each of said workstation, said first printer and said second printer, said print server including,
      a first print queue and a second print queue communicating with said first printer and said second printer, respectively, and
      a storage area including a first set of filtering information and a second set of filtering information, said first set of filtering information varying as a function of a first set of printing options with said first set of printing options being mapped to said first print queue, and said second set of filtering information varying as a function of a second set of printing options, with said second set of printing options being mapped to the second print queue; and
   a system for automatically modifying said interclient job ticket to provide one of a first modified user interface dialog and a second modified user interface for display on said display device, said automatically modifying system including a filtering subsystem for applying said first set of filtering information to said interclient job ticket for creating said first modified user interface dialog when said first print queue is selected with said workstation, and for applying said second set of filtering information to said interclient job ticket for creating said second modified user interface dialog when said second print queue is selected with said workstation.

2. The printing system of claim 1, in which said selected one of said first print queue and said second print queue comprises said first print queue, wherein, when a conflict exists between a printing option of said interclient job ticket and a printing option of said first set of filtering information, a default printing option is substituted in said first modified user interface dialog.

3. The printing system of claim 2, wherein when a first value, representative of the printing option of said interclient job ticket, and a second value, representative of said printing option of said first set of filtering information, are logically combined to yield a flag value.

4. The printing system of claim 1, in which said selected one of said first print queue and said second print queue comprises said first print queue, wherein said first set of filtering information and said second set of filtering information comprise a first printer user interface mask file and a second user interface mask file, respectively, and selected printing options of said interclient job ticket are masked with said first printer user interface mask file to provide said first modified user interface dialog.

5. The printing system of claim 4, wherein said masked selected printing options are deleted from or dimmed on said first modified user interface dialog.

6. The printing system of claim 4, in which said first and second printers belong to a family of printers, wherein:
   a user interface family mask generic to said first printer and said second printer is provided;
   a first printer configuration file and a second configuration file, identifying printing options available at said first printer and said second printer, respectively, are provided; and
   said family mask is combined with each of said first printer configuration file and said second printer configuration file to obtain said first user interface mask file and said second user interface mask file.

7. The printing system of claim 1, in which an electronic document is stored at said print server, wherein said client user chooses a selected group of printing options, with said first modified user interface dialog, and transmits a representation of said choices to said print server so that said choices are combined with said electronic document to create said network print job.

8. In a network printing system with a print server including a first print queue and a second print queue, the first print queue communicating with a first printer, and a second print queue communicating with a second printer, a method for generating a user interface dialog to be used in printing a network print job, the user interface dialog indicating, to a client user, a set of printing options available at a selected one of the first printer and the second printer, comprising the steps of:
   providing an interclient job ticket indicating, collectively, a first set of printing options and a second set of printing options respectively available at the first printer and the second printer;
   storing a first set of filtering information, varying as a function of the first set of printing options and a second set of filtering information, varying as a function of the second set of printing options;
   mapping the first set of filtering information with the first print queue and the second set of filtering information with the second print queue;
   selecting one of the first print queue and the second print queue with a workstation communicating with both the first print queue and the second print queue; and
   modifying the interclient job ticket with the first set of filtering information, when the first print queue is selected, to provide a first modified user interface dialog with a first set of printer options, and with the second set of filtering information, when the second print queue is selected, to provide a second modified user interface dialog with a second set of printer options, the first and second modified user interface dialogs being displayed selectively at the display device so that the client user chooses a selected one of the first printer options and the second printer options to develop the network print job.

9. The method of claim 8, in which the first print queue is selected with said selecting step and the first set of filtering information includes printing options, further comprising the step of substituting a default printing option in the first modified user interface dialog when a conflict exists between a printing option of the interclient job ticket and a printing option of the first set of filtering information.

10. The method of claim 8, in which the first print queue is selected with said selecting step and the first set of filtering information and the second set of filtering information comprise a first printer user interface mask file and a second user interface mask file, respectively, wherein said modifying step includes masking selected printing options of the interclient job ticket with the first printer user interface mask to provide the first modified user interface dialog.

11. The method of claim 10, further comprising the step of deleting the masked selected printing options from the first modified user interface dialog.

12. The method of claim 10, further comprising the step of dimming the masked selected printing options on the first modified user interface dialog.

13. The method of claim 10, in which the first and second printers belong to a family of printers, further comprising the steps of:

providing a user interface family mask generic to the first printer and the second printer;

providing a first printer configuration file and a second configuration file, identifying printing options available at the first printer and the second printer, respectively; and combining the family mask with each of the first printer configuration file and the second configuration file to obtain the first printer user interface mask file and the second user interface mask file.

14. The method of claim 8, further comprising the steps of:

storing an electronic document at the server;

choosing, with the automatically modified user interface dialog, a selected group of printing options;

transmitting a representation of the choices to the server so that the choices are combined with the electronic document to create the network print job.

* * * * *